Patented Oct. 9, 1923.

1,470,073

UNITED STATES PATENT OFFICE.

WILLIAM C. GEER AND JOHN B. DICKSON, OF AKRON, OHIO, ASSIGNORS TO THE B. F. GOODRICH COMPANY, OF NEW YORK, N. Y., A CORPORATION OF NEW YORK.

METHOD AND COMPOSITION FOR TREATING FIBROUS MATERIAL.

No Drawing.   Application filed November 21, 1922.  Serial No. 602,456.

*To all whom it may concern:*

Be it known that we, WILLIAM C. GEER and JOHN B. DICKSON, citizens of the United States, residing at Akron, in the county of Summit and State of Ohio, have invented a certain new and useful Method and Composition for Treating Fibrous Material, of which the following is a specification.

This invention relates to methods and compositions for treating fibrous materials, particularly leather, for the purpose of rendering them impervious to fluids, the invention being especially valuable in the impregnation of leather for shoe soles.

Its chief objects are to provide an improved method and an improved composition adapted to impregnate fibrous material so as to render it impervious to fluids, without unduly impairing its flexibility and without rendering the material greasy or sticky.

Our invention comprises treating the fibrous material with a composition formed of paraffin, rosin and rubber, preferably with a softening agent such as castor oil. Coloring ingredients may be added if desired.

In practicing our invention in its preferred form, the procedure is as follows:

Equal parts by weight of paraffin and rosin are melted together, heated to about 90° C., thoroughly mixed, and the rosin therein oxidized, as by blowing air or oxygen through the mixture or by treating the same with a non-gaseous oxidizing agent, such as nitric acid. The oxidation causes a precipitate to form in the molten mixture and the oxidation is preferably continued until such precipitation is substantially complete. The molten, supernatant liquid is then decanted or otherwise freed of the precipitate, the latter being rejected, and in 80 parts by weight of said molten liquid is dissolved 10 parts of thoroughly masticated crude rubber, as by stirring the rubber in small particles in the molten mass or masticating it in the presence of the molten liquid. A softener is preferably added to the mixture, either before, after, or during the addition of the rubber, and 5 parts by weight of castor oil has been found suitable as a softener for the materials mixed according to the recipe just given. The resulting product may then be allowed to cool, solidifying to a wax-like condition in which it may be conveniently handled and shipped, and it may again be brought to a molten condition for use in treating the fibrous material.

The material may be impregnated by simply dipping it or allowing it to stand in a molten mass of the wax-like substance obtained as above described, for a suitable length of time to become more or less saturated therewith, and it has been found that ordinary chrome tan leather, for example, may be suitably impregnated for sole leather by allowing it to stand in the molten mass for a period of one to two hours at about 85° C. Such temperature is preferred because higher temperatures may harmfully affect the leather.

The impregnating substance produced as above described is substantially colorless and when introduced to the chrome leather, as described, intensifies the greenish tinge of the chrome leather and darkens it. The substance may be dyed, however, with any suitable oil dye. If the appearance of oak tanned leather is desired, for example, about ½ per cent of mahogany oil brown may be added to the impregnating substance described. The coloring matter may be added at any stage of the process above described, but it is preferably mixed in after the other ingredients have been incorporated in order that the coloring matter may be subjected as little as possible to high temperatures, although this obviously depends upon the character of the coloring matter as to its resistance to change by heat.

The process is adapted for economical and rapid operation, since the ingredients are inexpensive, and highly specialized machinery is not required. Fibrous materials impregnated with the substance are highly impervious to fluids, and an improved waterproof leather, for example, may be obtained, its flexibility being to a large extent preserved, and objectionable properties such as stickiness or greasiness being avoided.

We claim:

1. The method of impregnating fibrous material which comprises dissolving rubber in an oxidized, molten mixture of paraffin and rosin and treating the fibrous material with the resulting product.

2. The method of impregnating leather which comprises treating the leather with a molten mixture of paraffin, rosin, rubber and a softener, the paraffin and rosin being first mixed together and the mixture treated with an oxidizing agent.

3. The method of producing a composition of matter which comprises mixing paraffin and rosin, subjecting the mixture to heat and treating it with an oxidizing agent, maintaining the resulting product in a molten state and dissolving rubber therein.

4. The method of producing a composition of matter which comprises mixing paraffin and rosin, subjecting the mixture to heat and treating it with an oxidizing agent, maintaining the resulting product in a molten state and dissolving rubber therein and introducing castor oil as a softener for the product.

5. A composition of matter comprising a solution of rubber in a mixture of paraffin and oxidized rosin.

6. A composition of matter resulting from mixing paraffin and rosin, treating the mixture in a molten state with an oxidizing agent, dissolving rubber in the resulting product, and adding a coloring material to the rubber solution.

7. A composition of matter comprising a mixture of paraffin, oxidized rosin, rubber, and castor oil.

8. Leather impregnated with a mixture comprising paraffin, oxidized rosin and rubber.

9. Leather impregnated with castor oil in association with a solution of rubber in a mixture of paraffin and oxidized rosin.

In witness whereof we have hereunto set our hands this 18 day of November, 1922.

WILLIAM C. GEER.
JOHN B. DICKSON.